US005642502A

United States Patent [19]
Driscoll

[11] Patent Number: 5,642,502
[45] Date of Patent: Jun. 24, 1997

[54] METHOD AND SYSTEM FOR SEARCHING FOR RELEVANT DOCUMENTS FROM A TEXT DATABASE COLLECTION, USING STATISTICAL RANKING, RELEVANCY FEEDBACK AND SMALL PIECES OF TEXT

[75] Inventor: James R. Driscoll, Orlando, Fla.

[73] Assignee: University of Central Florida, Orlando, Fla.

[21] Appl. No.: 350,334

[22] Filed: Dec. 6, 1994

[51] Int. Cl.⁶ .............................. G06F 17/30; G06F 7/00
[52] U.S. Cl. ...................... 395/605; 395/606; 395/616; 395/761; 364/DIG. 1; 364/225.4; 364/282.1; 364/274.8
[58] Field of Search ..................... 395/600, 605, 395/616, 606, 761; 364/419.05, DIG. 1

[56] References Cited

U.S. PATENT DOCUMENTS

| | | | |
|---|---|---|---|
| 5,062,143 | 10/1991 | Schmitt | 382/36 |
| 5,251,131 | 10/1993 | Masand et al. | 364/419.05 |
| 5,251,316 | 10/1993 | Anick et al. | 395/600 |
| 5,293,552 | 3/1994 | Aalbersberg | 364/419.19 |
| 5,297,027 | 3/1994 | Morimoto et al. | 364/419.19 |
| 5,297,039 | 3/1994 | Kanaegami | 364/419.19 |
| 5,297,042 | 3/1994 | Morita | 364/419.19 |
| 5,299,125 | 3/1994 | Baker et al. | 364/419.08 |
| 5,301,109 | 4/1994 | Landauer et al. | 364/419.19 |
| 5,305,208 | 4/1994 | Doi et al. | 364/419.19 |
| 5,309,359 | 5/1994 | Katz et al. | 364/419.19 |
| 5,319,790 | 6/1994 | Kumagai | 395/800 |
| 5,321,608 | 6/1994 | Namba et al. | 364/419.08 |
| 5,321,609 | 6/1994 | Yianilos et al. | 364/419.13 |
| 5,323,313 | 6/1994 | Davis et al. | 364/419.17 |
| 5,325,298 | 6/1994 | Gallant | 364/419.19 |
| 5,325,465 | 6/1994 | Hung et al. | 395/63 |
| 5,331,554 | 7/1994 | Graham | 364/419.07 |
| 5,331,556 | 7/1994 | Black, Jr. et al. | 364/419.08 |
| 5,351,190 | 9/1994 | Kondo | 364/419.08 |
| 5,418,951 | 5/1995 | Damashek | 395/600 |
| 5,537,586 | 7/1996 | Amram et al. | 395/600 |
| 5,544,049 | 8/1996 | Henderson | 364/419.19 |
| 5,544,352 | 8/1996 | Egger | 395/600 |
| 5,576,954 | 11/1996 | Driscoll | 395/603 |

Primary Examiner—Thomas G. Black
Assistant Examiner—Jean R. Homere
Attorney, Agent, or Firm—Brian S. Steinberger; Law Offices of Brian S. Steinberger

[57] ABSTRACT

Search system and method for retrieving relevant documents from a text data base collection comprised of patents, medical and legal documents, journals, news stories and the like. Each small piece of text within the documents such as a sentence, phrase and semantic unit in the data base is treated as a document. Natural language queries are used to search for relevant documents from the data base. A first search query creates a selected group of documents. Each word in both the search query and in the documents are given weighted values. Combining the weighted values creates similarity values for each document which are then ranked according to their relevant importance to the search query. A user reading and passing through this ranked list checks off which documents are relevant or not. Then the system automatically causes the original search query to be updated into a second search query which can include the same words, less words or different words than the first search query. Words in the second search query can have the same or different weights compared to the first search query. The system automatically searches the text data base and creates a second group of documents, which as a minimum does not include at least one of the documents found in the first group. The second group can also be comprised of additional documents not found in the first group. The ranking of documents in the second group is different than the first ranking such that the more relevant documents are found closer to the top of the list.

14 Claims, 19 Drawing Sheets

Fig. 3

How fast does the orbiter travel on orbit?

Eight Documents

| DocId | Document |
|---|---|
| 1. | Normally, two orbital maneuvering system engine thrusting sequences are used to place the orbiter on orbit. |
| 2. | The orbiter's engines maintain a velocity on orbit of approximately 25,405 feet per second. |
| 3. | In some missions, only one orbital maneuvering system thrusting sequence is used to place the orbiter on orbit. |
| 4. | The engines are used to increase the velocity of the orbiter on orbit. |
| 5. | Atlantis will travel more than half a million miles in ocean research. |
| 6. | The engines are also used for any major velocity changes. |
| 7. | Entry interface occurs at approximately 25,000 feet per second velocity. |
| 8. | An ATO is an abort mode used to move the orbiter to a safe altitude. |

Fig. 4

Words Not Used how
does
the
on
two
are
used
to
of
is
per
at
will
more
than
a
in
also
for
any
some
only
one
an
from

Fig. 5

List of Words Used in the Original Query left
orbit
orbiter
travel

Fig. 6

Words Used in Each of the Eight Documents

| DocId | Document Word List |
|---|---|
| 1. | normally, orbital, maneuvering, system, engine, thrusting, sequences place, orbiter, orbit |
| 2. | orbiter's, engines, maintain, velocity, orbit, approximately, feet, second |
| 3. | missions, orbital, maneuvering, system, thrusting, sequence, place, orbiter, orbit |
| 4. | engines, increase, velocity, orbiter, orbit |
| 5. | Atlantis, travel, half, million, miles, ocean, research |
| 6. | engines, major, velocity, changes |
| 7. | entry, interface, occurs, approximately, feet, second, velocity |
| 8. | ATO, abort, mode, move, orbiter, safe, altitude |

Fig. 7

Words Used in the Eight Documents
(N=8)

| Word | Number of Documents the word is in (NDOCS) | Inverse Document Frequency ($\log_2 N/NDOCS$) |
|---|---|---|
| abort | 1 | 3 |
| altitude | 1 | 3 |
| approximately | 2 | 2 |
| Atlantis | 1 | 3 |
| ATO | 1 | 3 |
| changes | 1 | 3 |
| engine | 1 | 3 |
| engines | 4 | 1 |
| entry | 1 | 3 |
| feet | 2 | 2 |
| half | 1 | 3 |
| increase | 1 | 3 |
| interface | 1 | 3 |
| maintain | 1 | 3 |
| major | 1 | 3 |
| maneuvering | 2 | 2 |
| miles | 1 | 3 |
| million | 1 | 3 |
| missions | 1 | 3 |
| mode | 1 | 3 |
| move | 1 | 3 |
| normally | 1 | 3 |
| ocean | 1 | 3 |
| occurs | 1 | 3 |
| orbit | 4 | 1 |
| orbital | 2 | 2 |
| orbiter | 4 | 1 |
| orbiter's | 1 | 3 |
| place | 2 | 2 |
| research | 1 | 3 |
| safe | 1 | 3 |
| second | 2 | 2 |
| sequence | 1 | 3 |
| sequences | 1 | 3 |
| system | 2 | 2 |
| thrusting | 2 | 2 |
| travel | 1 | 3 |
| velocity | 4 | 1 |

Fig. 8

Semantics of Words Used in the Original Query

| Word | # of Categories in Roget's Thesaurus | Category Numbers |
|---|---|---|
| fast | 15 | 515.2<br>668.2<br>701.11<br>515.4<br>35.17<br>174.15<br>293.12<br>373.19<br>587.21<br>665.25<br>799.14<br>854.12<br>854.16<br>969.17<br>174.17<br>799.19 |
| orbiter | 0 | - |
| travel | 9 | 162.1<br>172.2<br>176.3<br>177<br>177.1<br>162.2<br>172.5<br>177.18<br>177.21 |
| orbit | 13 | 231.2<br>245.2<br>280.2<br>282.2<br>383.1<br>724.4<br>893.4<br>913.1<br>913.2<br>1070.16<br>1073.2<br>280.10<br>913.5 |

Fig. 9A

Semantics of Words Used in the Documents

| Word | # of Categories | Category Numbers |
|---|---|---|
| abort | 4 | 410.15 |
| | | 819.5 |
| | | 856.6 |
| | | 1072.13 |
| altitude | 2 | 272.1 |
| | | 300.5 |
| approximately | 3 | 223.23 |
| | | 244.6 |
| | | 791.14 |
| Atlantis | 0 | - |
| ATO | 0 | - |
| changes | 0 | - |
| engine | 2 | 875.10 |
| | | 1039.3 |
| engines | 0 | - |
| entry | 8 | 187.3 |
| | | 189.1 |
| | | 189.5 |
| | | 197.19 |
| | | 292.6 |
| | | 549.4 |
| | | 549.14 |
| | | 628.5 |
| feet | 0 | - |
| half | 9 | 477.5 |
| | | 746.3 |
| | | 747.3 |
| | | 749.6 |
| | | 818.2 |
| | | 874.2 |
| | | 477.13 |
| | | 874.5 |
| | | 831.16 |

Fig. 9B

| | | |
|---|---|---|
| increase | 20 | 119.1 |
| | | 193.1 |
| | | 251.1 |
| | | 253.1 |
| | | 254.1 |
| | | 259.1 |
| | | 392.1 |
| | | 882.4 |
| | | 911.1 |
| | | 14.2 |
| | | 119.2 |
| | | 244.4 |
| | | 245.4 |
| | | 251.4 |
| | | 251.6 |
| | | 253.5 |
| | | 259.4 |
| | | 259.5 |
| | | 259.7 |
| | | 882.6 |
| interface | 3 | 211.3 |
| | | 467.3 |
| | | 799.4 |
| maintain | 12 | 334.5 |
| | | 385.7 |
| | | 347.8 |
| | | 421.8 |
| | | 449.12 |
| | | 474.5 |
| | | 600.10 |
| | | 624.19 |
| | | 826.6 |
| | | 855.4 |
| | | 900.21 |
| | | 952.11 |
| major | 6 | 304.1 |
| | | 568.8 |
| | | 575.18 |
| | | 709.15 |
| | | 841.19 |
| | | 996.17 |
| maneuvering | 2 | 381.5 |
| | | 415.4 |
| miles | 0 | - |
| million | 2 | 881.11 |
| | | 883.6 |
| missions | 0 | - |

Fig. 9C

| | | |
|---|---|---|
| mode | 9 | 262.1 |
| | | 384.1 |
| | | 530.11 |
| | | 532.2 |
| | | 578.1 |
| | | 709.10 |
| | | 764.1 |
| | | 764.4 |
| | | 934.6 |
| move | 24 | 328.3 |
| | | 403.2 |
| | | 415.3 |
| | | 759.13 |
| | | 888.2 |
| | | 994.2 |
| | | 93.14 |
| | | 105.12 |
| | | 145.5 |
| | | 159.17 |
| | | 162.2 |
| | | 172.5 |
| | | 172.6 |
| | | 176.11 |
| | | 177.18 |
| | | 321.4 |
| | | 328.4 |
| | | 375.12 |
| | | 422.6 |
| | | 439.5 |
| | | 734.8 |
| | | 893.7 |
| | | 901.11 |
| | | 903.9 |
| normally | 0 | - |
| ocean | 4 | 240 |
| | | 240.1 |
| | | 240.3 |
| | | 247.3 |
| occurs | 0 | - |
| orbit | 13 | 231.2 |
| | | 245.2 |
| | | 280.2 |
| | | 282.2 |
| | | 383.1 |
| | | 724.4 |
| | | 893.4 |
| | | 913.1 |
| | | 913.2 |
| | | 1070.16 |
| | | 1073.2 |
| | | 280.10 |
| | | 913.5 |

Fig. 9D

| | | |
|---|---|---|
| orbital | 0 | - |
| orbiter | 0 | - |
| place | 27 | 8.10 |
| | | 159.1 |
| | | 159.4 |
| | | 228.1 |
| | | 230.8 |
| | | 231.1 |
| | | 245.2 |
| | | 463.1 |
| | | 607.1 |
| | | 641.1 |
| | | 724.3 |
| | | 724.5 |
| | | 764.1 |
| | | 806.2 |
| | | 824.2 |
| | | 842.2 |
| | | 977.2 |
| | | 159.11 |
| | | 159.12 |
| | | 615.12 |
| | | 643.4 |
| | | 729.16 |
| | | 757.5 |
| | | 807.9 |
| | | 808.6 |
| | | 887.3 |
| | | 988.12 |
| research | 3 | 937.4 |
| | | 937.30 |
| | | 941.8 |
| safe | 4 | 729.12 |
| | | 494.8 |
| | | 1006.4 |
| | | 1007.21 |
| second | 11 | 616.6 |
| | | 616.9 |
| | | 709.20 |
| | | 745.1 |
| | | 754.2 |
| | | 823.2 |
| | | 829.3 |
| | | 1004.6 |
| | | 332.12 |
| | | 449.13 |
| | | 873.6 |

Fig. 9E

| | | |
|---|---|---|
| sequence | 8 | 166.1 |
| | | 802.2 |
| | | 806.2 |
| | | 811.2 |
| | | 814 |
| | | 834.1 |
| | | 886.1 |
| | | 930.4 |
| sequences | 0 | - |
| system | 7 | 381.1 |
| | | 384.1 |
| | | 766.4 |
| | | 806.1 |
| | | 806.3 |
| | | 977.2 |
| | | 1070.1 |
| thrusting | 0 | - |
| travel | 9 | 162.1 |
| | | 172.2 |
| | | 176.3 |
| | | 177 |
| | | 177.1 |
| | | 162.2 |
| | | 172.5 |
| | | 177.18 |
| | | 177.21 |
| velocity | 3 | 172.4 |
| | | 174 |
| | | 177.12 |

Fig. 10

Document List of all DocIds 1
2
3
4
5
6
7
8

Fig. 11

Ranked List of Documents due to Original Query

| DocId | SIM |
|-------|--------|
| 5 | 9.0000 |
| 4 | 2.7265 |
| 1 | 2.0338 |
| 3 | 2.0338 |
| 2 | 1.7111 |
| 8 | 1.4679 |
| 6 | 0.7111 |
| 7 | 0.7111 |

Fig. 12

Words Used in the Second Query fast
orbit
orbiter

Fig. 13

Ranked List of Documents due to Second Query

| DocId | SIM |
|-------|--------|
| 4 | 2.0598 |
| 1 | 2.0338 |
| 3 | 2.0338 |
| 2 | 1.0444 |
| 8 | 1.0096 |
| 6 | 0.0444 |
| 7 | 0.0444 |

Fig. 14

Words Used in the Third Query engines
fast
increase
orbit
orbiter
velocity

Fig. 15

Ranked List of Documents due to Third Query

| DocId | SIM |
|-------|--------|
| 2 | 3.1559 |
| 3 | 3.0564 |
| 1 | 2.0564 |
| 6 | 2.0444 |
| 7 | 1.1444 |
| 8 | 1.1346 |

METHOD AND SYSTEM FOR SEARCHING FOR RELEVANT DOCUMENTS FROM A TEXT DATABASE COLLECTION, USING STATISTICAL RANKING, RELEVANCY FEEDBACK AND SMALL PIECES OF TEXT

This invention relates to natural language data processing, and in particular to a method and system for the retrieval of natural language data. This invention is related to U.S. patent application Ser. Nos. 08/148,688 filed on Nov. 5, 1993,which is incorporated by reference which issued as U.S. Pat. No. 5,576,954 on Nov. 19, 1996. This invention was developed with grant funding provided in part by NASA KSC Cooperative Agreement NCC 10-003 Project 2, for use with: (1) NASA Kennedy Space Center Public Affairs; (2) NASA KSC Smart O & M Manuals on Compact Disk Project; and (3) NASA KSC Materials Science Laboratory.

BACKGROUND AND PRIOR ART

Locating information using large amounts of natural language documents(referred to often as text data) is an important problem. Current commercial text retrieval systems generally focus on the use of keywords to search for information. These systems typically use a Boolean combination of keywords supplied by the user to retrieve documents. See column 1 for example of U.S. Pat. No. 4,849,898, which is incorporated by reference. In general, the retrieved documents are not ranked in any order of importance, so every retrieved document must be examined by the user. This is a serious shortcoming when large collections of documents need to be searched. For example, some data base searchers start reviewing displayed documents by going through some fifty or more documents to find those most applicable.

Statistically based text retrieval systems generally rank retrieved documents according to their statistical similarity to a user's search request(referred to often as the query). Statistically based systems provide advantages over traditional Boolean retrieval methods, especially for users of such systems, mainly because they allow for natural language input.

A secondary problem exists with the Boolean systems since they require that the user artificially create semantic search terms every time a search is conducted. This is a burdensome task to create a satisfactory query. Often the user will have to redo the query more than once. The time spent on this task is quite burdensome and would include expensive on-line search time to stay on the commercial data base.

Using a list of words to represent the content of documents is a technique that also has problems of it's own. In this technique, the fact that words are ambiguous can cause documents to be retrieved that are not relevant to the search query. Further, relevant documents can exist that do not use the same words as those provided in the query. Using semantics addresses these concerns and can improve retrieval performance. Prior art has focussed on processes for disambiguation. In these processes, the various meanings of words(also referred to as senses) are pruned(reduced) with the hope that the remaining meanings of words will be the correct one. An example of well known pruning processes is U.S. Pat. No. 5,056,021 which is incorporated by reference.

However, the pruning processes used in disambiguation cause inherent problems of their own. For example, the correct common meaning may not be selected in these processes. Further, the problems become worse when two separate sequences of words are compared to each other to determine the similarity between the two. If each sequence is disambiguated, the correct common meaning between the two may get eliminated.

The inventor of the subject invention has used semantics to avoid the disambiguation problem. See U.S. patent application Ser. Nos. 08/148,688 filed on Nov. 5, 1993 which issued as U.S. Pat. No. 5,576,954 on Nov. 19, 1996. For semantics, the various meanings of words are not pruned but combined with the various meanings of other words and the statistically common meanings for small groups of words yield the correct common meaning for those words. This approach has been shown to improve the statistical ranking of retrieved information. In the semantic approach, the prunning process for common meaning is replaced by a statistical determination of common meaning. Crucial to this approach is the fact that retrieval documents must be small.

Relevance feedback has sometimes been used to improve statistical ranking. For relevance feedback, the judgements of the user concerning viewed information are used to automatically modify the search for more information. However, in relevance feedback, conventional IR(Information Retrieval) systems have a limited recall. G. Salton, Automatic Information Organization and Retrieval, McGraw-Hill, 1968. This limited recall causes only a few relevant documents are retrieved in response to user queries if the search process is based solely on the initial query. This limited recall indicates a need to modify (or reformulate) the initial query in order to improve performance. During this reformulation, it is customary to have to search the relevant documents iteratively as a sequence of partial search operations. The results of earlier searches can be used as feedback information to improve the results of later searches. One possible way to do this is to ask the user to make a relevance decision on a certain number of retrieved documents. Then this relevance information can be manually used to construct an improved query formulation and recalculate the similarities between documents and query in order to rank them. This process is known as relevance feedback.

A basic assumption behind relevance feedback is that, for a given query, documents relevant to it should resemble each other in a sense that they have reasonably similar keyword content. This implies that if a retrieved document is identified as relevant, then the initial query can be modified to increase its similarity to such a relevant document. As a result of this reformulation, it is expected that more of the relevant documents and fewer of the nonrelevant documents will be extracted. The automatic construction of an improved query is actually straightforward, but it does increase the complexity of the user interface and the use of the retrieval system, and it can slow down query response time. Essentially, document information viewed as relevant to a query can be used to modify the weights of terms and semantic categories in the original query. A modification can also be made using documents viewed as not relevant to a query.

The main problems with using relevance feedback are many. First, the original query becomes very large whenever all the words in a viewed relevant document are added to the original query. Secondly, it takes a long time to read large documents and decide if they are relevant or not. Another problem is that often only part of a large document is actually relevant. Other patents have tried to address this problem. See U.S. Pat. No. 5,297,027 to Morimoto et al.

The inventor is not aware of any prior art that combines statistical ranking, semantics, relevance feedback and using sentences(or clauses) as documents when queries are expressed in natural language in order to be able to search for and retrieve relevant documents.

SUMMARY OF THE INVENTION

The first objective of the present invention is to provide a natural language retrieval system which combines statistical ranking, semantics, relevance feedback and using sentences (or clauses) as documents when using natural language queries in order to be able to search for and retrieve relevant documents.

The second object of this invention is to provide an automated document retrieval system that minimizes the reading efforts of the user.

The third object of this invention is to provide an automated document retrieval system that minimizes the need for highlighting relevant words on a screenful of text in order to be able to indicate relevant information from a query.

The preferred method of the invention uses statistical ranking and the concept of semantics as shown in U.S. patent application Ser. Nos. 08/148,688 filed on Nov. 5, 1993 which issued as U.S. Pat. No. 5,576,954 on Nov. 19, 1996, in order to rank relevant documents retrieved for a user's original query. After submitting a query, the user then reads one or more of the topmost documents in the ranked list of documents produced for the query. Since each document is very small (a clause, or a sentence at most), it is very easy for the user to quickly indicate if the document is relevant or not relevant to the original query. For each document flagged as relevant or not relevant, an automatic modification is made to the original query to essentially increase or decrease the importance of words. The new query is used to create another ranked list of documents. The feedback process repeats until the user stops the process.

In the subject invention, semantics helps to push relevant documents upward in a statistically ranked list. Relevance feedback helps the user automatically identify alterative words useful for expressing the query. The effort displayed by the user is minimal since the user views only small mounts of text and makes only a single judgement call on whether the small piece of text is relevant or not relevant for each small mount of text.

The invention can be applied to tasks such as retrieving documents relevant to a search request(sometimes referred to as archival retrieval), filtering documents which are relevant to a search request(sometimes referred to as routing) and answering questions from general information data bases.

Further objects and advantages of this invention will be apparent from the following detailed description of a presently preferred embodiment which is illustrated schematically in the accompanying drawings.

BRIEF DESCRIPTION OF THE FIGURES

FIG. 3 illustrates an example of an original user query and a collection of eight documents.

FIG. 4 is a list of words considered too general to have any value as a keyword, or as a word having any useful semantic value.

FIG. 5 is a list of words used in the original query of FIG. 3; this list becomes Query Word List in Step 100 of FIG. 1.

FIG. 6 provides the list of words used in each of the eight documents of FIG. 3.

FIG. 7 is a list of statistical data for all the words in the eight documents of FIG. 3; the information shown is a count of the number of documents containing each word, and the IDF of each word.

FIG. 8 reveals semantic information about each word used in the original query in FIG. 3; for each word listed in FIG. 5, this figure shows a count of the semantic categories triggered by the word, along with a list of the numeric codes for those categories. This information comes for Roget's International Thesaurus (5th Edition), edited by Robert L. Chapman, HarperCollins Publishers, 1992.

FIG. 9a–9e reveal semantic information about each word used in the collection of eight documents in FIG. 3; for each word listed in FIG. 6, this figure show a count of the semantic categories triggered by the word, along with a list of the numeric codes for those categories. This information comes from Roget's International Thesaurus (5th Edition), edited by Robert L. Chapman, HarperCollins Publishers, 1992.

FIG. 10 provides the Document List of DocIds created in Step 200 of FIG. 1 for the example of FIG. 3.

FIG. 11 is a list of the eight documents in the example of FIG. 3 ranked in order of their relevance or similarity (SIM value) to the words used in the original query of FIG. 3 and shown in FIG. 5; both the DocId and the SIM value are shown as a pair in this list. This list is a sorted Relevancy List created at Step 900 in FIG. 1.

FIG. 12 is a list of words in a second query built from the original query after removing the words found in Document 5 (only the word "travel" was removed). This list is created by Step 1300 in FIG. 1.

FIG. 13 is a list of seven documents in the example of FIG. 3 (Document 5 has been removed) ranked in order of their relevance or similarity (SIM value) to the words of the second query of FIG. 12; both the DocID and the SIM value are shown as a pair in this list. This list is a sorted Relevancy List created at Step 900 in FIG. 1.

FIG. 14 is a list of words in a third query built by adding words found in Document 4 to the words of the second query of FIG. 12; this list is created by Step 1200 in FIG. 1.

FIG. 15 is a list of six documents in the example of FIG. 3 (Document 5 and Document 4 have been removed) ranked in order of their relevance or similarity (SIM value) to the words of the third query of FIG. 14; both the DocId and the SIM value are shown as a pair in this list. This list is a sorted Relevancy List created by Step 900 in FIG. 1. The top document on this list (Document 2) provides the answer to the original query of FIG. 3.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

A prototype of the inventor's process has been successfully used at the NASA KSC Public Affairs Office. The performance of the prototype was measured by a count of the number of documents one must read in order to find an answer to a natural language question. In some queries, a noticeable semantic improvement has been observed. For example, if only keywords are used for the query "How fast does the orbiter travel on orbit?" then 17 retrieved paragraphs must be read to find the answer to the query. But if semantic information is used in conjunction with key words then only 4 retrieved paragraphs need to be read to find the answer to the query. Thus, the prototype enabled a searcher to find the answer to their query by a substantial reduction of the number of documents that must be mad.

Reference will now be made in detail to the present preferred embodiment of the invention as illustrated in the accompanying drawings.

The present preferred embodiment is demonstrated using an environment where a user's original query is a simple question and the user is searching for an answer to the question. During the search, we expect the user to see relevant and non-relevant documents. The user is expected to continue until a document answering the question is read, or until there are no more documents left to read.

The detailed description refers to acronyms and terminology that is described in the following chart.

| Terminology | |
|---|---|
| SIM for a query and a document | A number which measures the relevance of a document to a query. |
| qword | A word in the list of words used in a query. |
| cat | A semantic category code. |
| qp | The probability a qword triggers a cat. |
| dword | A word in the list of words used in a document. |
| dp | The probability a dword triggers a cat. |
| DocId | The identifier for a document, the document number. |
| N | Total number of documents. |
| NDOCS for a word | The number of documents a word is in. |
| IDF for a word | The inverse document frequency which is defined here to be $\log_2(N/NDOCS$ for the word). |
| Document | List of words used in a document. FIG. 6 shows eight of these lists. |
| Word List | |
| Query Word List | List of words used in a query. |
| Document List | List of DocIds. |
| Relevancy List | List of DocId, SIM pairs. |

Statistical Ranking with Semantics

Figure 2:
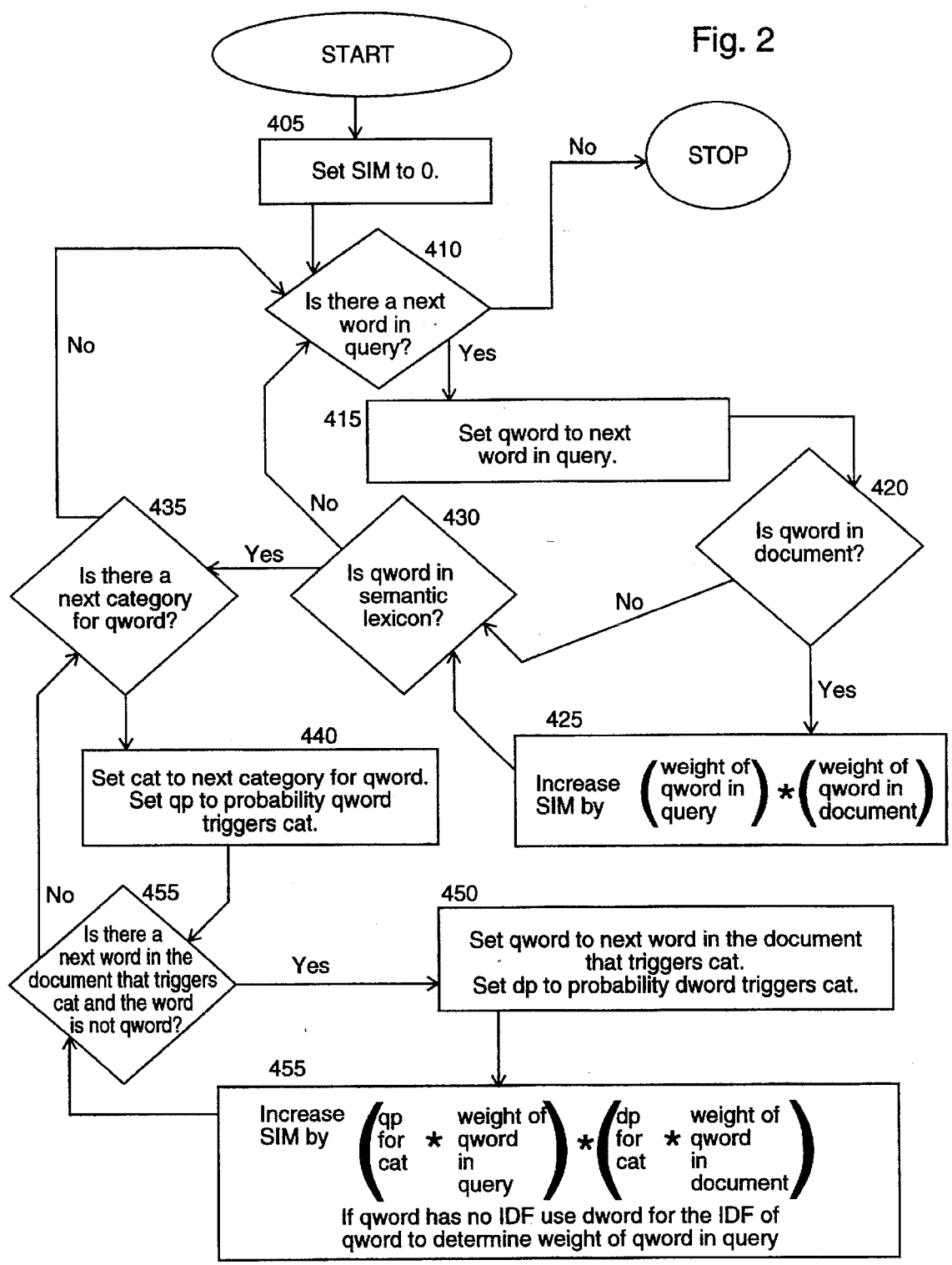
FIG. 2 illustrates the procedure used in patent application with Ser. No. 08/148,688 (filed on Nov. 5, 1993 which issued as U.S. Pat. No. 5,576,954 on Nov. 19, 1996) to determine a number to indicate the relevance or similarity of a document to a query.

FIG. 2 illustrates the procedure used in U.S. patent application Ser. No. 08/148,688 (filed on Nov. 5, 1993 which issued as U.S. Pat. No. 5,576,954 on Nov. 19, 1996) to determine a number to indicate the relevance or similarity of a document to a query. The procedure is based on the existence of a semantic lexicon. For a given word, the semantic lexicon indicates all the senses (different meanings) of a word. Roget's International Thesaurus (5th Edition), edited by Robert L. Chapman, HarperCollins Publishers, 1992 can be used as a semantic lexicon. The procedure illustrated in FIG. 2 also uses a statistical similarity calculation.

To illustrate, FIG. 3 provides an original user query (a question) and a collection of eight documents, where each document is a sentence and has a DocId which is an integer number. Notice that Document 2 explicitly answers the user query.

In statistical systems it is common to have a list of words which can be ignored because they are relatively useless as keywords. FIG. 4 provides a list of words not used for this example. Using the list of words not used, the example of FIG. 3 can be transformed into the words used in the original query of FIG. 5 and the words used in each of the eight documents of FIG. 6.

FIG. 7 provides a list of statistical data for the words used in all of the eight documents, in alphabetical order. The number of documents that each word is in is shown in the second column of the table. This is called NDOCS for a word. The third column of the table in FIG. 7 indicates a measure of the importance of each word.

The formula used for calculating the importance of a word is a statistical formula. A good one to use for this example is the inverse document frequency (IDF) formula:

$$\text{IDF of a word} = \log_2(N/NDOCS \text{ for the word})$$

where N is the total number of documents (8) and NDOCS is the number of documents a word is in. For example, since "orbit" is in 4 documents, $$\text{IDF for orbit} = \log_2(8/4) = \log_2(2) = 1$$

and since "increase" is in one document, $$\text{IDF for increase} = \log_2(8/1) = \log_2(8) = 3.$$

These IDF numbers are recorded in the third column of FIG. 7. It is clear that words which are in many documents are less important (as search words) than words which are in only a few documents. FIG. 8 provides the semantics of the words in the original query for each word used in the original query (FIG. 5), the second column shows the number of senses (meanings) the word has in Roget's Thesaurus, and the third column lists the numeric codes for those different meanings.

FIG. 9 provides the semantics of the words used in the eight documents. For each word used in the eight documents (FIG. 7), the second column shows the number of senses (meanings) the word has in Roget's Thesaurus, and the third column lists the numeric codes for those different meanings.

Notice that all but one of the words used in the query are used in the eight documents. The word "fast" does not appear in the eight documents.

For this example, a semantic category will be a "large category" in Roget's Thesaurus. There are 1073 large categories. The number of smaller categories will be used to determine a probability for a specific large category. For example, consider the word "fast", which triggers category "174.15" and category "174.17"; each of these is in the large category "174". So, the word "fast" triggers category "174" with a probability of $2/15$ since 15 is the number of smaller categories triggered by the word "fast."

Also in this example, the weight of a word in a document will be the frequency of the word in the document multiplied by the word's IDF value. In the example, all frequencies turn out to be 1, so the weight of a word in a document becomes the word's IDF value.

The calculation of a SIM value for a query and a document can now be explained by reference to the Similarity Procedure in FIG. 2 and a small sample calculation. Consider the words used in the original query of FIG. 5 and the words used in Document 4 of FIG. 6. These two lists are called the Query Word List and the Document Word List, and they are the inputs to the Similarity Procedure.

Step 405 sets the SIM value to zero. Step 410 sets qword to "fast". Since "fast" is not in Document 4, Step 420 causes movement to Step 430. Since "fast" does trigger semantic categories, Step 430 causes movement to Step 435 and Step 440 causes cat to be "515" and qp to be $1/15$. At Step 445, there is no word in Document 4 that triggers "515" so Step 435 is executed again. Steps 435, 440, and 445 re repeatedly executed with no movement to Step 450 until category "174" is used. At Step 440, cat eventually becomes "174" and qp becomes $2/15$ since there are two of "174" in the list of categories triggered by "fast". At Step 450, dword becomes "velocity" since "velocity" triggers "174". Also, dp becomes $1/3$ since "velocity" triggers three separate categories.

At Step 455, notice that since "fast" is not a word in any of the documents, its IDF is not defined in FIG. 7; so, in this case, the IDF of the word "velocity" is substituted. Another possibility in this case is to substitute a very high IDF value for undefined IDF values. At Step 455, SIM is increased by $$(2/15 * 1) * (1/3 * 1) = 0.0444$$

so SIM now equals 0.0444.

Eventually, at Step 435, there are no more categories triggered by "fast" and this causes movement to Step 410.

At Step 410, "orbit" is the next word in the query and, at Step 415, qword now becomes "orbit". At Step 420, the fact that "orbit" is also in Document 4 causes movement to Step 425. At Step 425, SIM is increase by the weight of "orbit" in the query multiplied by the weight of "orbit" in Document 4, and this amount is $$(1)*(1)=1.0000$$

so SIM now equals 1.0444.

At Step 430, since "orbit" also triggers semantic categories, there is movement to Step 435. Steps 435, 440, and 445 are repeatedly executed for the semantic categories triggered by "orbit". For category "245" triggered by "orbit", the word "increase" in Document 4 is also a trigger. So, when cat becomes "245" and qp becomes $1/13$, Step 450 causes dword to become "increase" and dp to become $1/20$. Then, at Step 455, SIM is increased by $$(1/13 * 1)*(1/20 * 3) = 0.0154$$

so SIM now equals 1.0598. Note that the IDF of "increase" is 3, and so the weight of "increase" in Document 4 is 3.

Notice that Step 445 does not select the word "orbit" in Document 4, since qword is "orbit" and the semantic contribution of "orbit" in Document 4 was handled earlier by Step 425. Eventually, at Step 435, there are no more categories triggered by "orbit" and this causes movement to Step 410.

At Step 410, "orbiter" is the next word in the query and at Step 415, qword now becomes "orbiter". Since "orbiter" is also in Document 4, Step 420 causes movement to Step 425. At Step 425, SIM is increased by the weight of "orbiter" in the query multiplied by the weight of "orbiter" in Document 4, and this amount is $$(1)*(1)=1.0000$$

so SIM now equals 2.0598.

At Step 430, since "orbiter" does not trigger any semantic categories, there is movement to Step 410.

At Step 410, "travel" is the next (and last) word in the query and, at Step 415, qword now becomes "travel". Since "travel" is not in Document 4, Step 420 causes movement to Step 430. Since "travel" does trigger semantic categories, Step 430 causes movement to Step 435 and Step 440 causes cat to be "162" and qp to be $2/9$ since "travel" triggers "162.1" and "162.2". At Step 445, there is no word in Document 4 that triggers "162", so Step 435 is executed again. Steps 435, 440, and 445 are repeatedly executed with no movement to Step 450 until category "172" is used, and category "177" is used.

When Step 440 causes cat to become "172" and qp to be $2/9$, Step 445 causes movement to Step 450. The value of qp is $2/9$ because "travel" triggers "172.2" and "172.5". At Step 450, dword becomes "velocity" and dp becomes $1/3$ since "velocity" triggers "172" among three triggered separate categories. At Step 455, SIM is increased by $$(2/9 * 3)*(1/3 * 1) = 0.2222$$

so SIM now equals 2.2820.

When Step 440 causes cat be become "177" and qp to be $4/9$, Step 445 causes movement to Step 450. The value of qp is $4/9$ because "travel" triggers "177", "177.1", "177.18", and "177.21". At Step 450, dword becomes "velocity" and dp becomes $1/3$. At Step 455, SIM is increased by $$(4/9 * 3)*(1/3 * 1) = 0.4444$$

so SIM now equals 2.7264.

Eventually, at Step 435, there are no more categories triggered by "travel" and this causes movement to Step 410. At Step 410, the procedure for calculating SIM stops because there are no more words in the query.

The final value of SIM is 2.7264 and this represents a measure of the similarity between the original query in FIG. 3 and Document 4 in FIG. 3. The DocId of 4 and the SIM value of 2.7264 are the outputs of the Similarity Procedure.

Relevance Feedback with Small Amounts of Text

Figure 1:
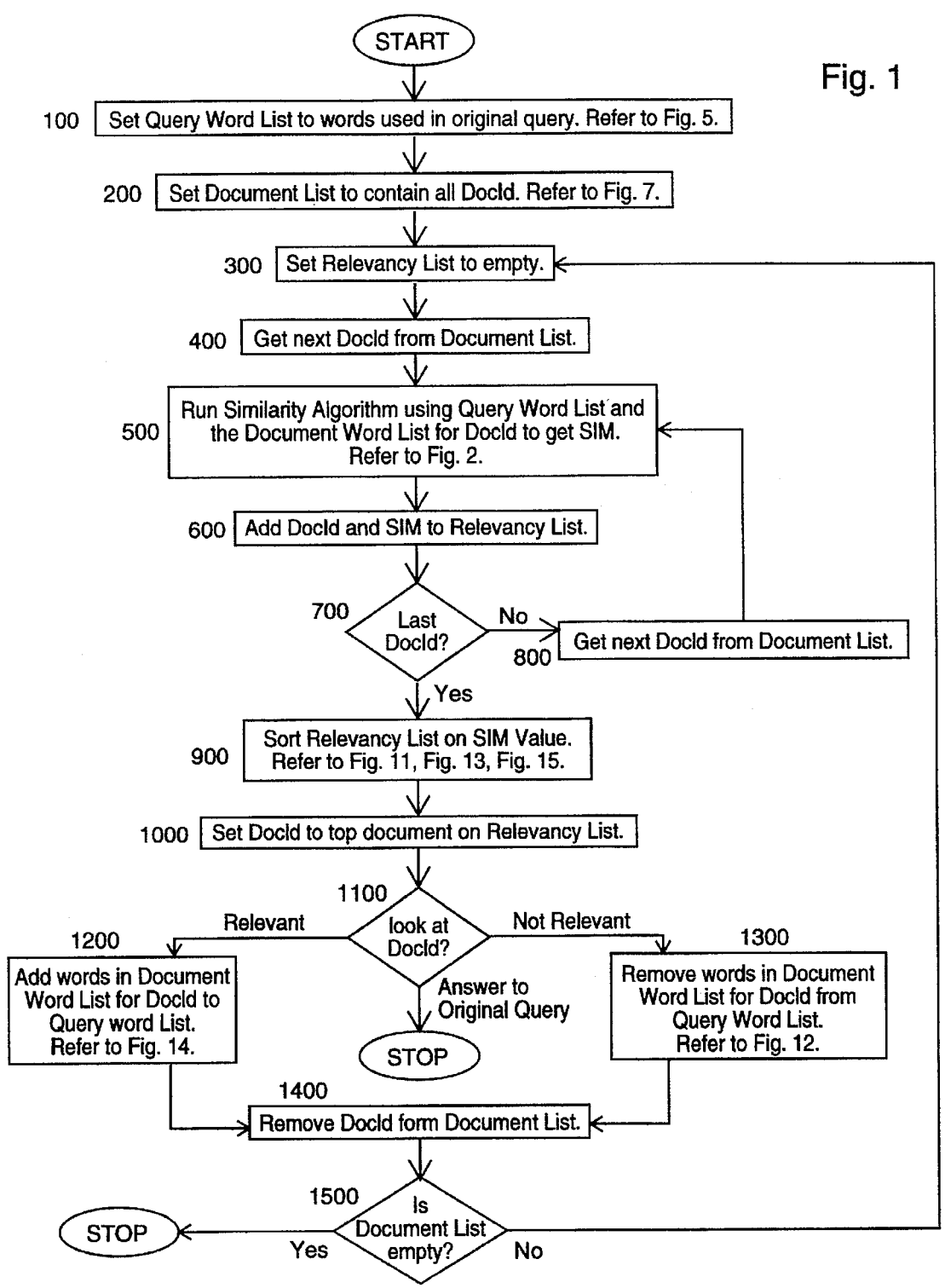
FIG. 1 illustrates the preferred embodiment of the invention.

FIG. 1 illustrates the preferred embodiment of the invention. The Feedback Procedure of FIG. 1 activates the Similarity Procedure of FIG. 2 many times. To illustrate, FIG. 3 provides an original user query (a question) and a collection of eight documents, where each document is a sentence and has a DocId which is an integer. Notice that Document 2 explicitly answers the user query.

This is a question/answer environment and the preferred embodiment of the invention is designed for this environment. The invention will help the user retrieve Document 2 (the answer to the user query in FIG. 3).

Figure 10:
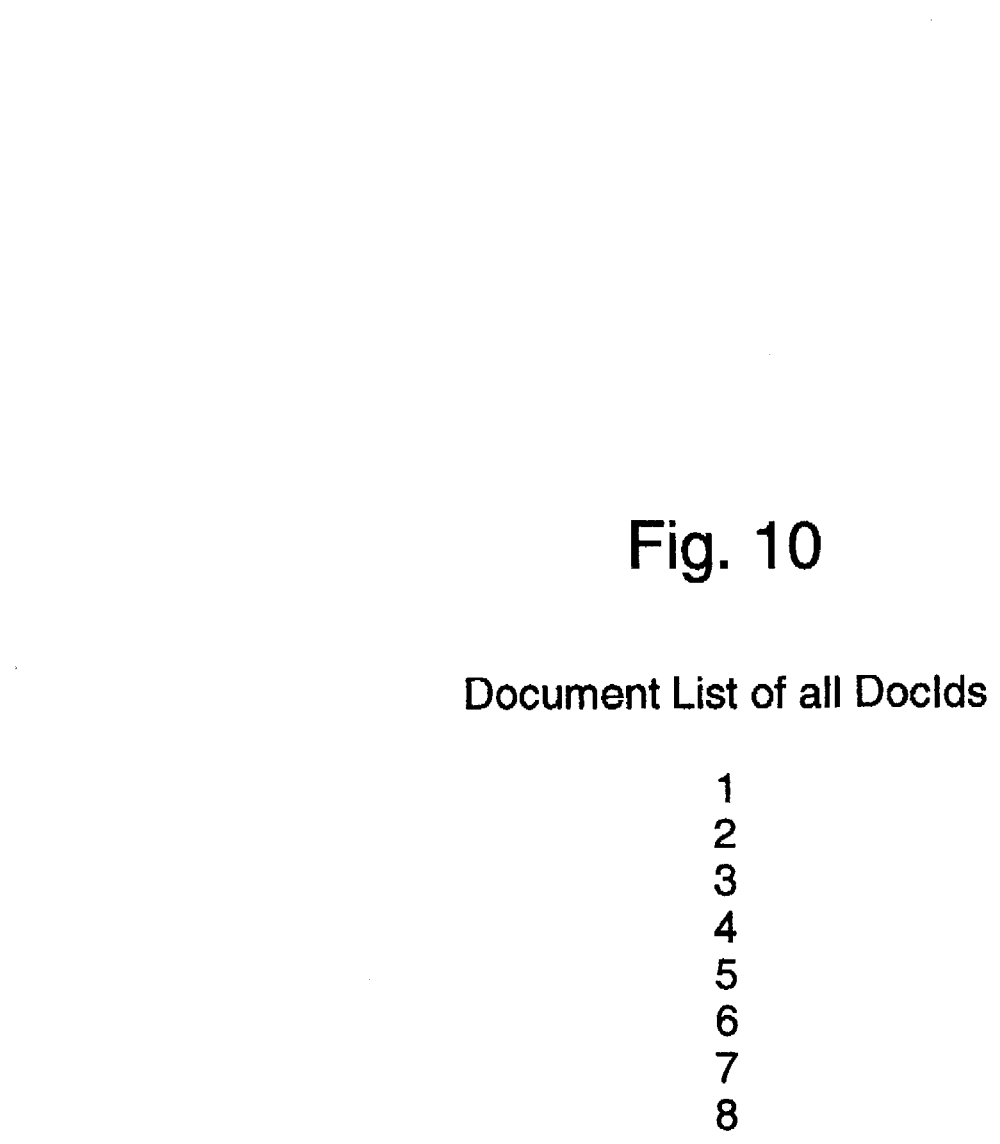

At Step 100, Query Word List is set to the list of four words used in the original user query and shown in FIG. 5. At Step 200, Document Word List is set to the list of eight DocIds shown in FIG. 10. At Step 300, Relevancy List is set to be empty. Eventually, Relevancy List will be a list of DocId, SIM pairs sorted by SIM value to represent a ranking of the documents based on their statistical similarity to the query.

At Step 400, DocId is set equal to the first document identifier in Document List. DocId is set to Document 1.

At Step 500, the Query Word List of FIG. 5 and the Document Word List for Document 1 in FIG. 6 are input to the Similarity Procedure of FIG. 2. The output of the Similarity Procedure is DocId of 1 and SIM of 2.0338.

At Step 600, the pair DocId of 1 and SEVI of 2.0338 is added to the Relevancy List. Since there are more DocIds to process in Document List, Step 700 causes movement to Step 800 where DocId becomes Document 2. Then Step 500 activates the Similarity Procedure, again. Steps 500, 600, 700, and 800 cause the Similarity Procedure to be activated for each DocId in Document List, along with addition of the DocIds and their SIM values as pairs in Relevancy List.

Eventually, Step 700 causes movement to Step 900 where the Relevancy List is sorted on SIM value.

FIG. 11 reveals the result of Step 900 for the original user query and the eight documents of FIG. 3. Statistical keyword and semantic ranking has determined that Document 5 is the most relevant document for the original user query, Document 4 is the next most relevant document for the original query, and so on.

At Step 1000, DocId is set to Document 5 and the document

"Atlantis will travel more than half a million miles in ocean research."

is shown to the user at Step 1100 where the user must decide if the sentence is relevant, not relevant, or answers the original query. The sentence is obviously not relevant, so Step 1100 causes movement to Step 1300. At Step 1300, any word in the Document Word List for Document 5 (as shown in FIG. 6) is removed from the Query Word List of FIG. 5; the result is shown in FIG. 12 where the word "travel" has been removed. The Query Word List now has three words in it, and it becomes the automatically built second query.

At Step 1400, DocId of 5 is removed from the Document List since the user has read the document. Since there are still seven documents in Document List, Step 1500 causes movement to Step 300 where the Relevancy List is set to empty, again.

At Step 400, DocId is set equal to Document 1 again and Steps 500, 600, 700, and 800 cause the activation of the Similarity Procedure of FIG. 2 for computing the similarity of the second query to each of the remaining seven documents, along with addition of the DocIds and their SIM values in Relevancy List. Eventually, Step 700 causes movement to Step 900 where the Relevancy List is sorted on SIM value.

FIG. 13 reveals the result of Step 900 for the second query and the seven documents not read by the user. Statistical keyword and semantic ranking has determined that Document 4 is now the most relevant document.

At Step 1000, DocId is set to Document 4 and the document

"The engines are used to increase the velocity of the orbiter on orbit."

is shown to the user at Step 1100 where the user must decide if the sentence is relevant, not relevant, or answers the original query. Most people would agree that the sentence is relevant, so Step 1100 causes movement to Step 1200.

At Step 1200, the words in the Document Word List for Document 4 (as shown in FIG. 6) are added to the Query Word List for the second query of FIG. 12; the result is shown in FIG. 14 where the words "engines", "increase", and "velocity" are added. The Query Word List now has six words in it, and it becomes the automatically built third query.

At Step 1400, DocId of 4 is removed from the Document List since the user has read the document. Since there are still six documents in the Document List, Step 1500 causes movement to Step 300 where the Relevancy List is set to empty, again.

At Step 400, DocId is set equal to Document 1 again and Steps 500, 600, 700, and 800 cause the activation of the Similarity Procedure of FIG. 2 for computing the similarity of the third query to each of the remaining six documents, along with addition of the DocIds and their SIM values in Relevancy List. Eventually, Step 700 causes movement to Step 900 where the Relevancy List is sorted on SIM value.

FIG. 15 reveals the result of Step 900 for the third query and the six documents not yet read by the user. Statistical keyword and semantic ranking has determined that Document 2 is now the most relevant document.

At Step 1000, DocId is set to Document 2 and the document

"The orbiter's engines maintain a velocity on orbit of approximately 25,405 feet per second."

is shown to the user at Step 1100 where the user must decide if the sentence is relevant, not relevant, or answers the original query. Obviously, Document 2 provides the answer to the original query, so the retrieval process stops after three sentences were read.

The feedback and sentencer features are quite useful to user in saving time and enhancing the quality of the search. The feedback feature of the subject invention helps to introduce new words and gets rid of bad words. e.g. the word travel is removed from FIG. 5 and "velocity" is added in FIG. 14.

The sentencer minimizes reading time and allows the user to make their relevancy decisions very easy by just requiring the user to indicate by a key stroke whether a document is relative or not relative. In addition, the sentencer saves the user time by forcing the user to discover small "units" which are relevant or not relevant and the decision is easy.

While the preferred embodiment has been described in reference to one type of document collection, the invention can be equally applicable to all types of documents such as but not limited to patents, legal documents, medical documents, articles, journals and the like.

Further, there is no size limit to the number of documents that can be searched.

The invention can be incorporated on personal computers to search for internal files and can be applied to modem search systems accessible to DIALOG, ORBIT, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for retrieving relevant text data from a text database collection in a computer without annotating, parsing or pruning the text database collection, comprising the steps of:

(a) searching a text database collection in a computer using a first search query of natural language to retrieve a first group of selected small pieces of text, where each of the selected small pieces of text corresponds to a document;

(b) weighting each word of the selected small pieces of text with semantics to form document weighted values for each of the selected small pieces of text in the first group;

(c) weighting each word in the first search query with semantics to form query weighted values;

(d) combining the query weighted values and the document weighted values to form similarity values for each of the selected small pieces of text;

(e) ranking the similarity values for each of the selected small pieces of text to form a first ranked list;

(f) applying feedback information based on a manual determination of the relevancy of each of the selected small pieces of text in the first ranked list to automatically create a second search query;

(g) repeating steps (a) to (e) to form a second ranked list, wherein the second ranked list includes a second group of selected small pieces of text, wherein the second group is missing at least one of the selected small pieces of text in the first group.

2. The method for retrieving relevant text data of claim 1, wherein each of the small pieces of text includes at least one of:

a sentence, a phrase, and a semantic unit.

3. The method for retrieving relevant text data of claim 1, wherein the steps of weighting includes:

statistical weighting.

4. The method for retrieving relevant text data of claim 1, wherein the second search query includes:

at least one less word from the first search query.

5. The method for retrieving relevant text data of claim 1, wherein the second search query includes:

at least one additional word to the first search query.

6. The method for retrieving relevant text data of claim 1, further including:

at least one identical word in the second search query has a weighted value different to its weighted value in the first search query.

7. The method for retrieving relevant text data of claim 1, further including:

at least one document in the second group has a different similarity value to the same document in the first group.

8. The method for retrieving relevant text data of claim 1, wherein the second group includes:

at least one less document that had been listed in the first group.

9. The method for retrieving relevant text data of claim 1, wherein the second group includes:

at least one additional document that was not found in the first group.

10. The method for retrieving relevant text data of claim 1, wherein the second ranked list includes:

a different raked order of documents than the first ranked list.

11. A method for retrieving relevant text data from a text database collection in a computer without annotating, parsing or pruning the text database collection, comprising the steps of:

(a) searching a text database collection in a computer using a first non-boolean search query to retrieve a first group of selected small pieces of text, where each of the selected small pieces of text corresponds to a document;

(b) weighting each word of the selected small pieces of text with semantics to form document weighted values for each of the selected small pieces of text in the first group;

(c) weighting each word in the first search query with semantics to form query weighted values;

(d) combining the query weighted values and the document weighted values to form similarity values for each of the selected small pieces of text;

(e) ranking the similarity values for each of the selected small pieces of text to form a first ranked list;

(f) applying feedback information based on a manual relevancy determination of each of the selected small pieces of text in the first ranked list to automatically create a second non-boolean search query;

(g) repeating steps (a) to (e) to form a second ranked list, wherein the second ranked list includes at least one additional document not found in the first ranked list.

12. The method for retrieving relevant text data of claim 11, wherein each of the small pieces of text includes at least one of:

a sentence, a phrase, and a semantic unit.

13. A method for retrieving relevant text data from a text database collection in a computer without annotating, parsing or pruning, comprising the steps of:

(a) searching a text database collection in a computer using a first search query of natural language to retrieve a first group of selected small pieces of text, where each of the selected small pieces of text corresponds to a document;

(b) weighting each word of the selected small pieces of text by semantics to form document weighted values for each of the selected small pieces of text in the first group;

(c) weighting each word in the first search query by semantics to form query weighted values;

(d) combining the query weighted values and the document weighted values to form similarity values for each of the selected small pieces of text;

(e) ranking the similarity values for each of the selected small pieces of text to form a first ranked list;

(f) automatically updating the first search query into a second search query based on feedback information from a manual determination on whether documents in the first ranked list are relevant, (g) repeating steps (a) to (e) to form a second ranked list, wherein the second ranked list includes a second group of selected small pieces of text, wherein the second group is missing at least one of the selected small pieces of text found in the first group.

14. The method for retrieving relevant text data of claim 13, wherein each of the small pieces of text includes at least one of:

a sentence, a phrase, and a semantic unit.

* * * * *